United States Patent [19]

Davis et al.

[11] Patent Number: 4,569,481

[45] Date of Patent: Feb. 11, 1986

[54] CORNER WATERING SYSTEM FOR CENTER PIVOT IRRIGATION MACHINES

[75] Inventors: John E. Davis, Hebron; Terry L. Zielke, Deshler; Ronald J. Coash, Hebron, all of Nebr.

[73] Assignee: Reinke Manufacturing Co., Inc., Deshler, Nebr.

[21] Appl. No.: 363,275

[22] Filed: Mar. 29, 1982

[51] Int. Cl.⁴ .............................................. B05B 3/12
[52] U.S. Cl. .................................................. 239/177.2
[58] Field of Search ..................... 239/1, 11, 177, 710, 239/719, 720, 721, DIG. 1, 177.1, 177.2

[56] References Cited

U.S. PATENT DOCUMENTS

| | | | |
|---|---|---|---|
| 3,750,953 | 8/1973 | Reinke | 239/177 |
| 3,797,517 | 3/1974 | Kircher et al. | 239/710 |
| 3,802,627 | 4/1974 | Seckler | 239/177 |
| 3,979,062 | 9/1976 | Christensen et al. | 239/177 |
| 4,249,698 | 2/1981 | Smith et al. | 239/177.2 |
| 4,340,183 | 7/1982 | Kegel et al. | 239/710 |

Primary Examiner—Andres Kashnikow
Assistant Examiner—Michael J. Forman
Attorney, Agent, or Firm—Kokjer, Kircher, Bradley, Wharton, Bowman & Johnson

[57] ABSTRACT

A center pivot irrigation machine having a swing arm for irrigating corner areas of a field. The swing arm has a steerable support tower which follows a buried cable to guide the swing arm into and out of the field corners. A double hinge connection between the main irrigation boom and the swing arm includes one hinge joint which accommodates pivoting of the swing arm and another hinge joint which controls the operation of the tower drive motors. A cam switch monitors the steering angle of the swing arm tower and turns the sprinklers of the swing tower on and off in accordance with the steering angle to achieve uniform water application. A secondary set of sprinklers on the main boom is deactivated and the entire machine is slowed when the steering angle indicates that the swing arm is covering a rapidly increasing area.

11 Claims, 20 Drawing Figures

CORNER WATERING SYSTEM FOR CENTER PIVOT IRRIGATION MACHINES

BACKGROUND OF THE INVENTION

This invention relates generally to irrigation equipment and more particularly to a center pivot irrigation machine which is provided with a swing arm attachment for irrigating corner areas of fields.

Although center pivot type irrigation machines have achieved considerable popularity and function satisfactorily for the most part, they are capable of watering only circular areas. The basic center pivot machine is not able to irrigate the corner areas of square fields or other areas outside of the circle covered by the machine. Various types of attachments have been proposed to more adequately cover the sizeable land area represented by the field corners. To date, the most successful type of "corner system" is known as a swing arm or swing span.

The swing arm is essentially an end span similar to the remainder of the irrigation machine except that it has a hinge connection with one end of the main boom and is supported by a tower having steerable wheels. As the main boom turns about the central pivot stand, the steerable tower follows a buried cable or other guide device which causes the swing arm to pivot out into the corners of the field and to retract back behind the main boom as the system departs from a corner. In this manner, the swing arm system provides an extension boom which is able to cover a good part of each corner of the field. The known prior art relating to swing arm corner systems includes U.S. Pat. Nos. 3,797,517 to Kircher et al., 3,802,627 to Seckler et al. and 3,902,517 to Daugherty et al.

All of the swing arm corner systems that have been proposed in the past fail to apply water in a uniform manner to the corners of the field. As the swing arm folds out into the corner, it travels faster than the system as a whole, and the area covered by the swing arm during its extension is underwatered. Conversely, the swing arm moves relatively slowly as it retracts out of the corner, and over watering occurs in the areas covered by the swing arm as it folds back behind the main boom. The overall result is that some areas near the field corners are underwatered and other areas are overwatered, and the effectiveness of the irrigation suffers accordingly.

The uniformity of the water pattern also suffers due to the changes that occur in the effective overall length of the irrigation system as the extension boom folds out and then back in. In order to apply water evenly, it is necessary to supply water to the machine at varying rates because much more water is required when the machine is operating at its maximum length than when it is at minimum length. For example, if the effective length of the system is 1280 feet with the swing arm fully retracted and 1545 feet with the swing arm fully extended, the water requirements are over 30% less in the retracted mode of operation than in the fully extended mode (when an end gun is included).

The need to provide varying amounts of water to the system detracts from the efficiency of the pumping equipment and the supply network. Also, the water supply must operate at much less than full capacity the majority of the time since full capacity is required only when the swing arm is fully extended. Even if the water supply has suffcent capacity to irrigate the total coverage area of the irrigation system, it may nevertheless be inadequate in actual practice because it must operate most of the time at 70% or less capacity. This makes many marginal wells impractical for use with the irrigation machine.

Efficiency of swing arm machines is dependent largely upon accurate guidance of the extension boom and effective control of the steering action and the speed of both the main and the extension booms. In the past, the extension boom has been attached to the end of the main boom by means of a hinge that permits the extension boom to swing in and out and a separate sliding mechanism that allows relative linear motion parallel to the extension boom. The linear motion is needed to operate switches that stop the tower of the swing arm when it moves too far ahead and to stop the last tower of the main boom if necessary to permit the swing arm tower to catch up. In addition to the cost and difficulty involved in constructing a suitable sliding mechanism, it is not uncommon for devices of this type to either slide erratically or completely bind. Consequently, the control arrangement operated by the sliding mechanism is subject to malfunction.

The end boom section which extends beyond the tower of the swing arm is typically supported by rods or cables extending to its outer end from a mast forming a vertical extension above the steerable tower. It is necessary to anchor the mast in a vertical position by supports such as truss rods or cables. If the boom section is relatively long and heavy, the truss rods or cables distort the shape of the swing span. In order to avoid this distortion, the rods or cables are sometimes extended back the full length of the swing span, thus increasing the material costs and detracting from the appearance of the structure.

SUMMARY OF THE INVENTION

The present invention is aimed at eliminating or reducing the aforementioned drawbacks associated with the known swing arm corner systems. It is an important object of the invention to provide an improved corner watering system that applies water to the corner areas of the field more uniformly than is achieved with the devices that have been proposed in the past. In accordance with the invention, the areas of overwatering and underwatering are significantly reduced by properly controlling the sprinklers on the extension boom. Since the rate of change in the area that is being covered by the extension boom is represented by the angulation of the wheels of the steerable tower, this steering angle is monitored and the sprinklers are turned on and off in accordance with the steering angle in a sequence that achieves substantially uniform water application as the extension boom pivots into and out of the corner areas of the field. The steering angle also controls the speed of the system in an indirect manner by slowing the main boom down when the extension boom is extending and speeding the main boom up when the extension boom is retracting. As a result, compensation is made for the head variation and the length changes that occur in the corner areas of the field, and a substantially uniform amount of water is applied to all areas of the field covered by the irrigation machine.

Another important object of the invention is to provide a corner watering system having increased hydraulic efficiency. The main boom has two sets of sprinklers arranged in alternating fashion, and one set is deactivated when the extension boom has folded out far enough to activate its sprinklers. The sprinklers on the extension boom are sized to apply approximately the same amount of water as the deactivated sprinklers on the main boom, and the total flow rate thus remains substantially constant. The entire system is slowed down in the corner areas of the field to compensate for the increased system length, and the depth of the water application is thereby maintained relatively constant throughout the coverage area of the machine. By operating the system at a substantially constant flow rate throughout its operating cycle, the water supply is used at its highest capacity nearly all of the time, and the inefficiencies and other problems associated with varying flow rates are avoided.

A further object of the invention is to provide, in a corner watering irrigation system of the character described, an improved mechanism for connecting the extension boom with the main boom. The double hinge arrangement permits the extension boom to pivot as required while also providing the linear motion that is necessary to properly control the towers. At the same time, the difficulties associated with sliding mechanisms are avoided.

An additional object of the invention is to provide an improved truss structure for the extension boom. The integrated truss which provides support for both the span section and the end boom section of the swing arm is more efficient and more attractive than the type of trusses that have been previously proposed.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
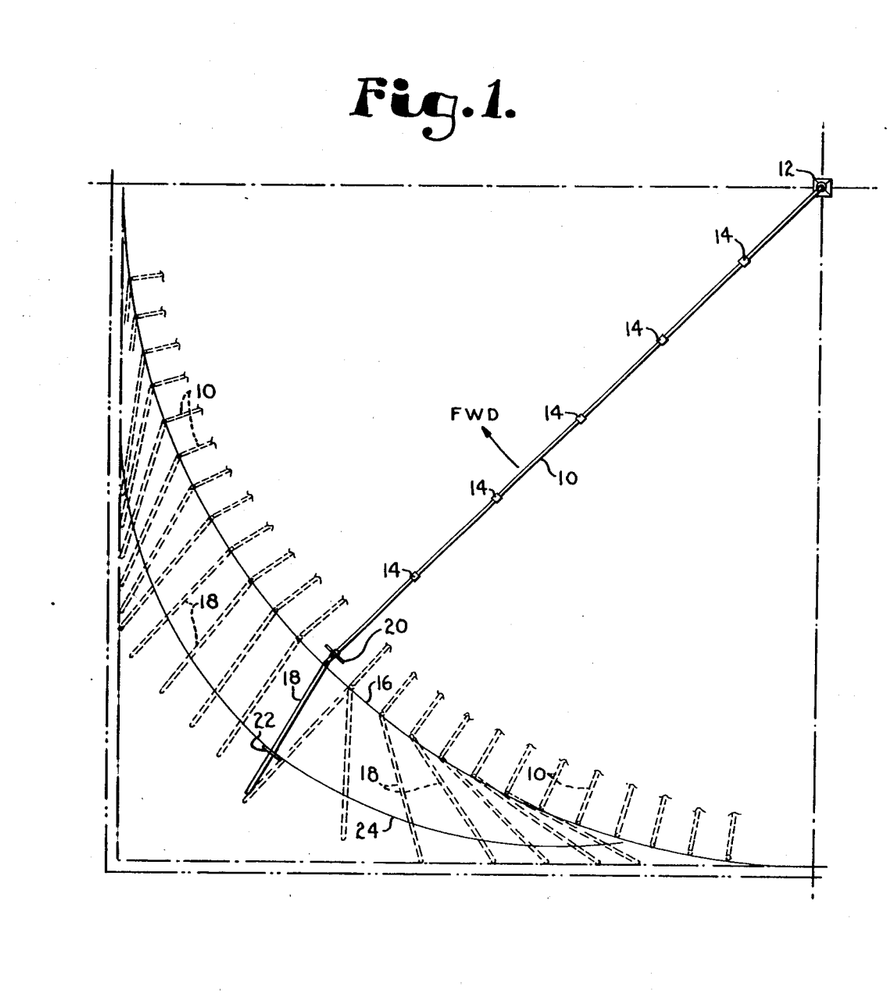
FIG. 1 is a diagrammatic plan view of a center pivot irrigation machine having a corner watering system constructed according to the present invention and showing the path of movement of the extension boom in one corner area of the field.
Figure 2:
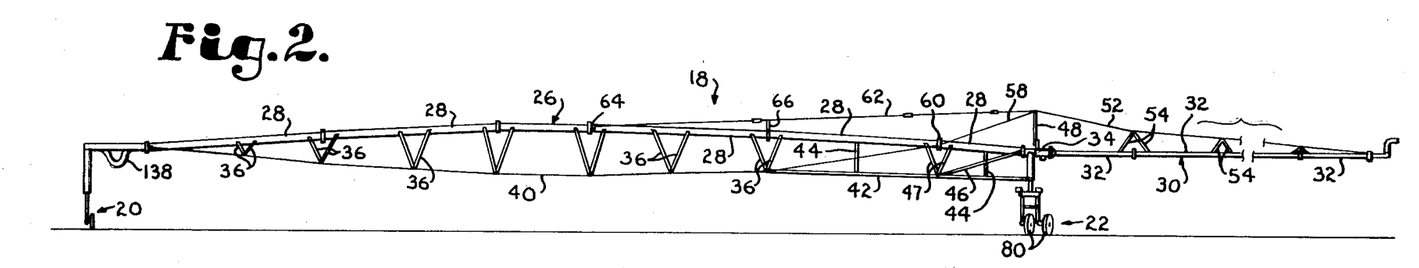
FIG. 2 is a fragmentary side elevational view of the extension boom of the irrigation machine.
Figure 3:
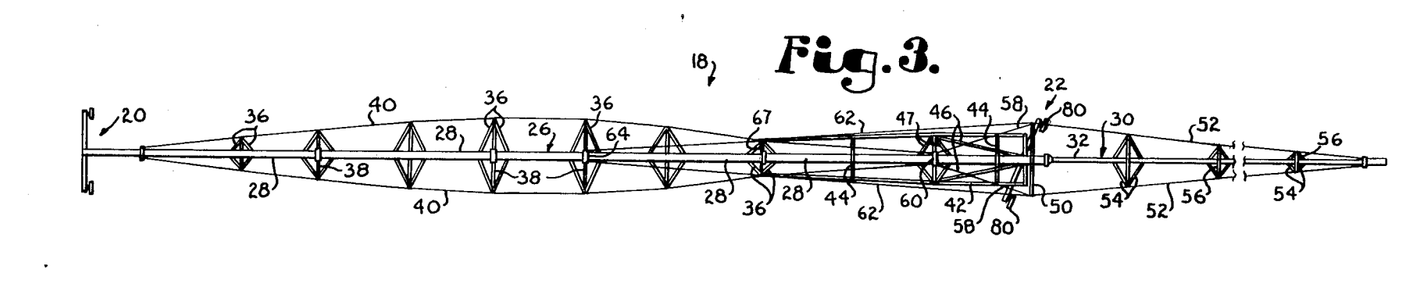
FIG. 3 is a fragmentary top plan view of the extension boom.
Figure 4:
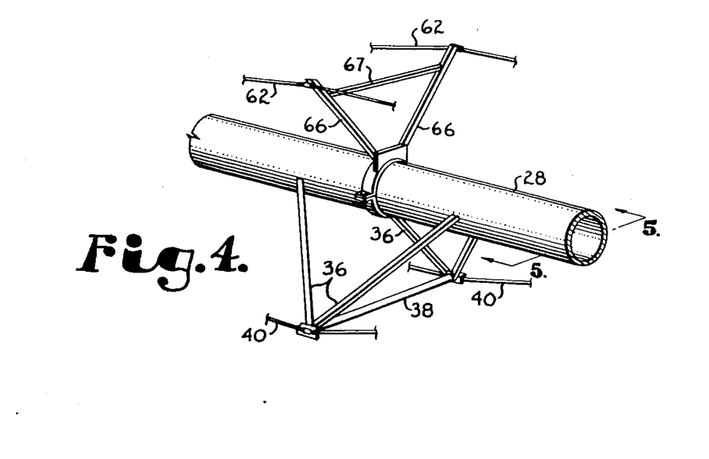
FIG. 4 is a fragmentary perspective view showing a portion of the truss structure on the extension boom.
Figure 5:
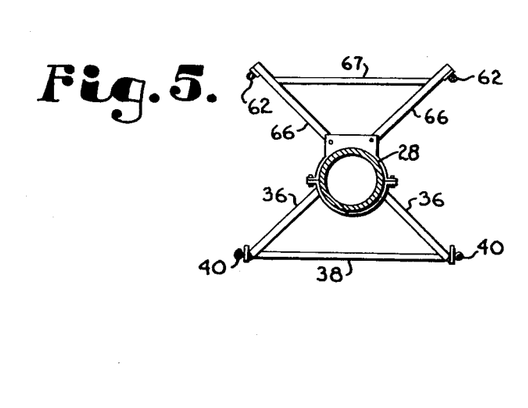
FIG. 5 is a fragmentary sectional view taken generally along line 5—5 of FIG. 4 in the direction of the arrows.

Referring now to the drawings in detail and initially to FIG. 1, a center pivot irrigation system constructed in accordance with the present invention includes a main boom 10 which pivots about a pivot stand 12 located at one end of the boom. Conventional support towers 14 support the main boom 10 at an elevated position above the field which is to be irrigated. The towers 14 have wheels that are driven in a conventional manner by electric drive motors (not shown), and the towers are maintained in a substantially straight line by a suitable alignment system of the type normally provided on center pivot machines. Water is pumped into boom 10 from a well and is applied to the field by sprinklers which will be discussed in more detail.

The main boom 10 covers a circular area of the field which is centered at the pivot stand 12. The boundary of the circular area covered by boom 10 is indicated at 16 in FIG. 1.

In accordance with the present invention, a swing arm corner system for irrigating the corner areas of the field includes an extension boom 18 which is pivotally connected with the outer end of the main boom 10. The pivotal connection is located adjacent to an outer tower 20 of the main boom which is referred to as the hinge tower. The extension boom 18 is supported on a steerable tower 22 which is referred to as the swing tower. Guidance of the extension boom 18 through the corners of the field is controlled by a buried cable 24 which is followed by the steerable swing tower 22, as will be more fully explained. The buried cable 24 is arranged in an arcuate pattern in the corners of the field so that the extension boom will swing out as the main boom approaches the corners. The cable is arranged in a predetermined and systematically measured line along the sides of the field so that the extension boom will fold back inwardly behind the main boom along the sides of the field.

The details of the extension boom 18 are best shown in FIGS. 2-5. Between towers 20 and 22, the extension boom has a span 26 which is formed by a plurality of pipes 28 connected end to end with one another. A cantilevered end boom section 30 located outwardly of the swing tower 22 is formed by smaller diameter pipe sections 32 also connected end to end with one another. A relatively short pipe section 34 is mounted on top of tower 22 and connects span 26 with the end boom section 30.

Span 26 is bowed upwardly somewhat and is provided on its underside with a truss formed by a plurality of V braces 36 extending outwardly and downwardly from the pipe sections 28. The V braces 36 in each pair are connected at the bottom by cross braces 38 (see FIG. 3). A pair of truss rods 40 connect with the vertices of the V braces 36 and with the span 26 at their opposite ends. Side loads applied to the swing tower 22 are resistant by horizontal braces 42 which are stablized by shorter braces 44 connecting with the boom. Another pair of braces 46 extend from braces 42 to connection with the extension boom at a location adjacent the swing tower 22. V braces 47 provide further bracing.

Forming a vertical extension of tower 22 is a mast 48 carrying on its top end a horizontal bar 50. The opposite ends of bar 50 are located on opposite sides of the extension boom 18. Truss rods 52 connect with the opposite ends of bar 50 and extend downwardly and inwardly to connection with the outer end portion of the end boom section 30. The rods 52 form the upper chords of a truss having boom section 30 as its lower chord and a plurality of inverted V braces 54 as the web members. Each V brace 54 connects with one of the truss rods 52 at its apex and with boom section 30 at the opposite end. Cross braces 56 extend between the apices of the V braces in each pair.

The truss structure also includes a pair of truss rods 58 which extend from the opposite ends of bar 50 to connection with span 26 at a flange 60 located between two of the pipe sections 28. Another pair of truss rods 62 extend from the opposite ends of bar 50 to connection with another flange 64 at the approximate midpoint of span 26. An inverted V brace 66 (FIGS. 4 and 5) connects with an intermediate portion of rod 62. A cross brace 67 extends between the V braces 66. Rods 62 serve as stiffeners which stiffen the structure and prevent distortion of the extension boom as it is being filled or emptied.

Truss rods 52 and V braces 54 are chosen so that the end boom section 30 is substantially straight when it is filled with water. The web members formed by V braces 54 transfer the weight of the pipe to truss rods 52. The truss rods form a smooth, segmented curve when the extension boom is filled with water. The location of flange 60 is such that the bending moment applied to it by the end boom section 30 is counterbalanced by the opposite bending moment applied by the span 26. Thus, flange 60 is at a point of zero bending moment, and the weight of span 26 inwardly of flange 60 is counterbalanced by the weight of the end boom section 30. Therefore, the truss structure make it possible to use either a longer span betwen towers 20 and 22 and/or lighter truss members.

Figures 6, 7, 8:
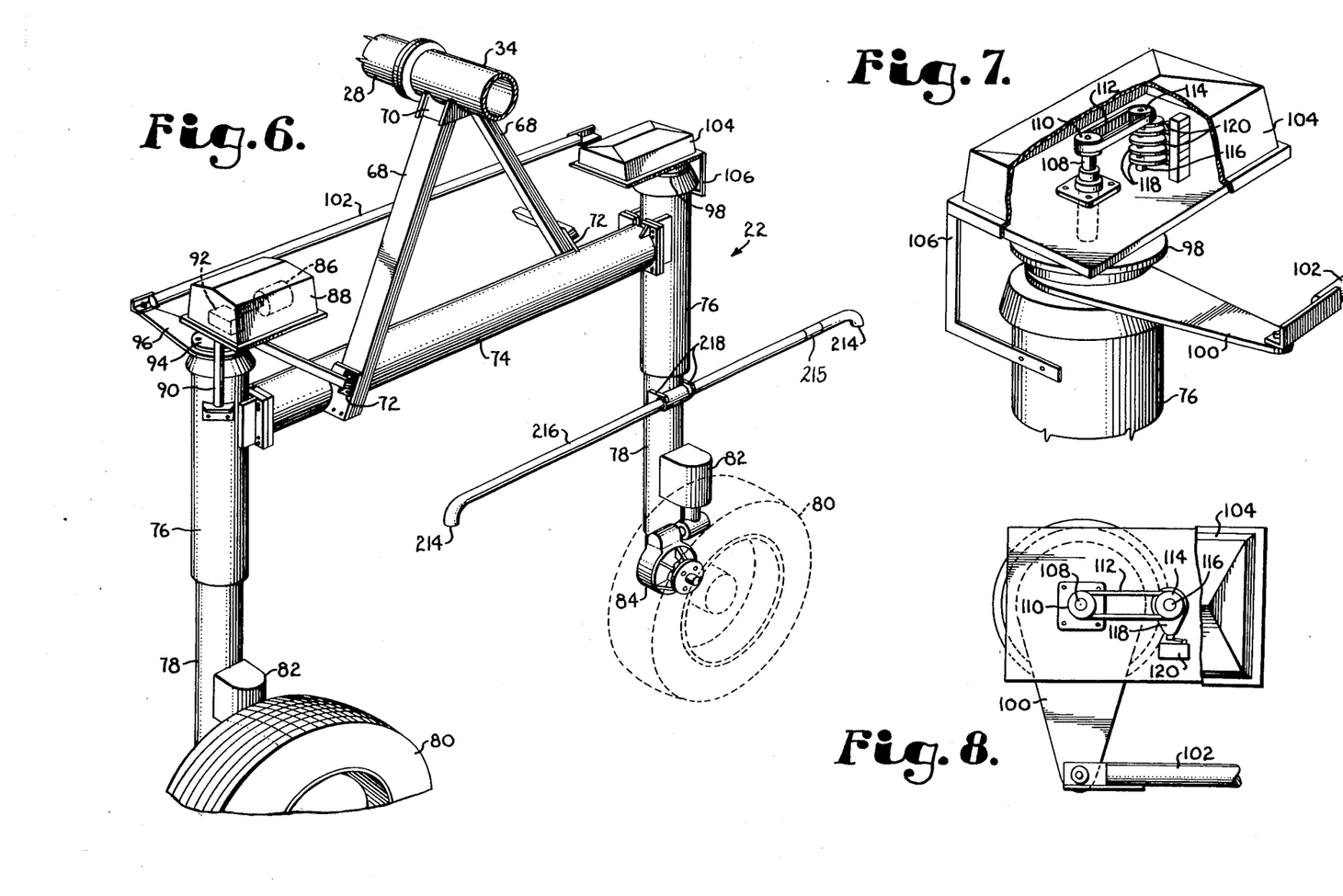
FIG. 6 is a fragmentary perspective view of the steerable support tower for the extension boom.
FIG. 7 is a fragmentary perspective view showing the control box of the steerable support tower, with a portion of the box broken away to illustrate the cam arrangement which monitors the steering angle.
FIG. 8 is a top plan view of the control box shown in FIG. 7, with a portion broken away for purposes of illustration.

Referring now to FIG. 6 in particular, the steerable swing tower 22 includes a pair of legs 68 which converge as they extend upwardly and connect with the extension boom 18 at their upper ends. A bracket 70 connects the short pipe section 34 of the extension boom to legs 68. Bracket plates 72 connect the bottom ends of legs 68 with a generally horizontal base 74 of the tower. The opposite ends of base 74 connect with vertical sleeves 76.

Each sleeve 76 receives a leg 78 carrying a ground engaging wheel 80 on its lower end. Each leg 78 has a conventional electric motor 82 which drives the corresponding wheel 80 through a gear box 84. Legs 78 are able to turn in sleeves 76 in order to steer the swing tower 22.

Steering is controlled by a steering motor 86. The steering motor is located in a box 88 mounted on an arm 90 extending upwardly from one of the sleeves 76. Motor 86 drives a gear box 92 which is mounted to a flange 94 of a steering arm 96. Flange 94 is also bolted to the top of leg 78 so that leg 78 turns in sleeve 76 to provide steering action when motor 86 is activated. The other leg 78 is bolted to a flange 98 of another steering arm 100 oriented parallel to arm 96. The two steering arms 96 and 100 are connected by a tie rod 102 which causes both wheels 80 to be steered in the same direction.

Referring now to FIGS. 7 and 8 in particular, the steering angle of wheels 80 is monitored by a cam operated switch mechanism located within a control box 104. The control box 104 is mounted on top of arm 106 secured to one of the sleeves 76. Extending upwardly into box 104 from flange 98 is a vertical shaft 108 carrying a pulley 110 on its top end. A cog belt 112 is drawn around pulley 110 and around another pulley 114 carried on a shaft 116. Shaft 116 also carries a plurality of cams 118 that control corresponding switches 120. As will be explained more fully, there are seven cams that control the irrigation machine in accordance with the steering angle of wheels 80 with respect to the extension boom.

Figures 9, 10, 11:
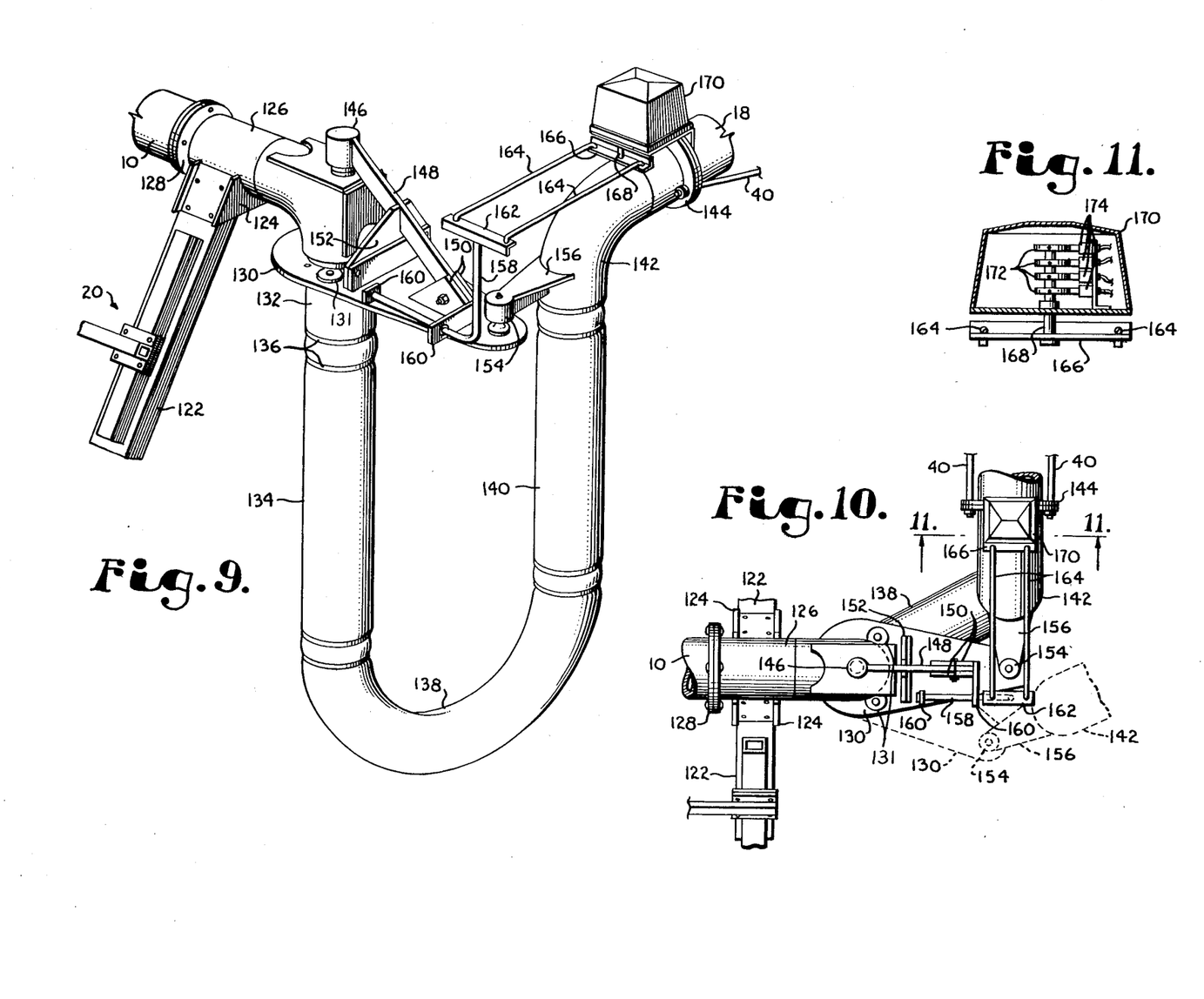
FIG. 9 is a fragmentary perspective view of the double hinge structure which connects the extension boom with the end of the main boom.
FIG. 10 is a fragmentary top plan view of the double hinge structure shown in FIG. 9, with the broken lines indicating movement of the extension boom about both hinge axes.
FIG. 11 is a fragmentary elevational view of the control box of the double hinge, with a portion broken away to illustrate the internal cam and switch arrangement.

The pivotal connection between the main boom 10 and the extension boom 18 is effected by the double hinge arrangement shown in FIGS. 9 and 10. The hinge tower 20 has a pair of upwardly converging legs 122 that connect at their top ends with a bracket 124. Connected to the bracket is an elbow 126 having a flange connection 128 with the outer end of the main irrigation boom 10. The vertical portion of elbow 126 extends through a plate 130 forming an arm of the hinge assembly. Plate 130 is supported to turn on the elbow by suitable rollers 131. A swivel coupling 132 connects with the lower end of elbow 126 and is clamped to a vertical hose 134 by hose clamps 136. A U shaped tube 138 is clamped at one end to hose 134 and at the opposite end to another vertical hose 140. Hose 140 is in turn clamped to an elbow 142 having a flange connection 144 with the inner end of the extension boom 18. The flexible V shaped hose arrangement permits water to flow to the extension boom 18 from the main boom 10.

A first hinge connection is formed by a ball joint 146 located immediately above and aligned with hose 134. The turning portion of the ball hitch 146 is carried on an arm 148 extending to connection with a pair of bracket plates 150 mounted on plate 130 at a location offset from the hinge axis. An intermediate portion of arm 148 connects with a bracket 152 secured to plate 130. The vertical hinge axis provided by the ball joint 146 permits the extension boom 18 to pivot into and out of the corner areas of the field that is being irrigated.

An outer hinge axis is provided by a ball joint 154 located on the outer end of plate 130. A ball is mounted on plate 130 and the turning portion of the joint is carried on an arm 156 extending from elbow 142.

The drive motors of the hinge and swing towers are controlled in accordance with the angular position of the extension boom about the outer hinge joint 154. An L shaped arm 158 has a horizontal portion secured to lugs 160 mounted on plate 130. The top end of arm 158 carries a bracket 162 having parallel rods 164 hooked to its opposite ends. The other ends of rods 164 are hooked to the opposite ends of another bracket 166 located above the elbow 142 and parallel to bracket 162. Extending upwardly from the center of bracket 166 is a shaft 168.

As best shown in FIG. 11, shaft 168 enters the bottom of a control box 170 mounted adjacent the flange connection 144. Carried on shaft 168 within box 170 are a plurality of cams 172 which control corresponding switches 174. The cams 172 and switches 174 control the drive motors of the hinge tower 20 and swing tower 22 in a manner that will be described more fully.

Figure 14:
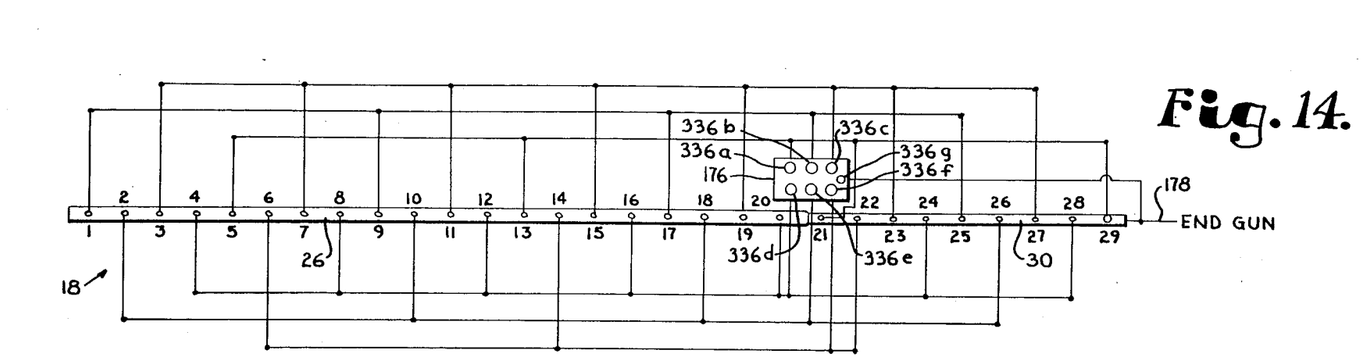
FIG. 14 is a schematic diagram of the control system for the sprinklers on the extension boom.

FIG. 14 schematically shows a series of sprinklers which are spaced along the length of the extension boom 18 and numbered consecutively from its inner end to its outer end. Each sprinkler on the extension boom has a valve, and the sprinkler valves are controlled by solenoid pilot valves numbered 1-7 and contained within a valve box 176 mounted on top of the swing tower 22. Water is supplied from the extension boom to the pilot valves, and each pilot valve has a control line connecting with selected sprinkler valves. For example, the No. 1 pilot valve has a control line that leads to sprinkler valve Nos. 5, 13, 21 and 29. Pilot valves 1-6 are normally closed solenoid valves that open when supplied with electric current, while the No. 7 valve is a normally open solenoid valve that closes when supplied with electric current. The No. 7 pilot valve controls the valve for the high volume end gun 178 mounted on the outer end of the extension boom.

Figure 13:
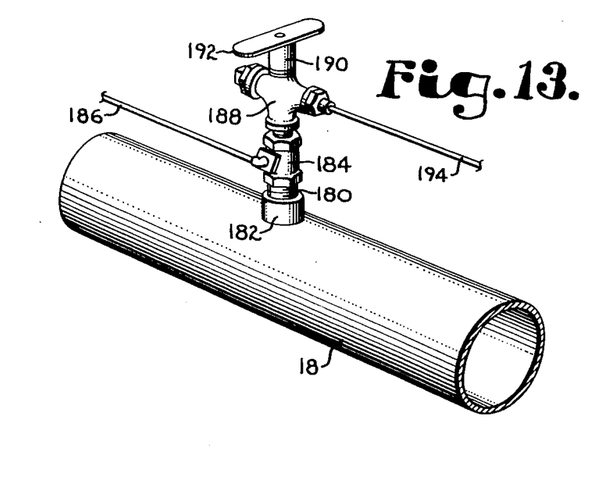
FIG. 13 is a perspective view illustrating one of the sprinklers on the extension boom.

FIG. 13 depicts the No. 4 sprinkler structure. A pipe nipple 180 is threaded into a water outlet 182 on top of boom 18. Threaded on top of the pipe nipple is a water control valve 184 that connects with the control line 186 leading from the previous sprinkler assembly which in this case is the No. 8 sprinkler (see FIG. 14). A strainer 188 is located on top of valve 184 and receives a riser 190 and a sprinkler 192 which applies water to the field when activated. The No. 4 sprinkler assembly controls some of the sprinklers on the main boom 10 and for this purpose has a control line 194 extending from the strainer 188. Valve 184 and the remaining sprinkler valves are normally open valves that normally supply water to the sprinkler 192. However, when water pressure is applied to the control line 186, valve 184 closes to cut off the water supply to the sprinkler.

Figure 15:
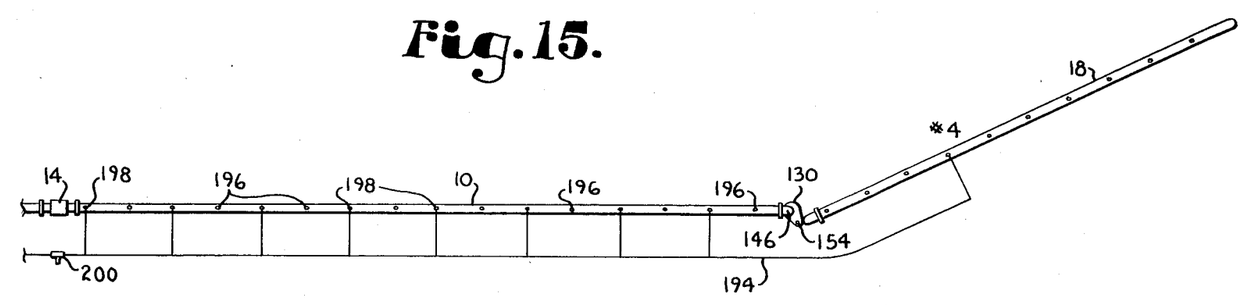
FIG. 15 is a schematic diagram of the control system for the secondary sprinklers on the main irrigation boom.

Referring to FIG. 15, the main boom 10 includes a set of primary sprinklers 196 and a set of secondary sprinklers 198. The primary and secondary sprinklers are arranged in alternating fashion along the length of the main boom. The primary sprinklers 196 are activated at all times, while the secondary sprinklers 198 are normally activated but are deactivated when pressure is applied to their associated valves by the control line 194 leading from the No. 4 sprinkler assembly on the extension boom. The control line 194 is provided with manual drain valves 200 located on the support towers 14 of the main irrigation boom.

Figure 12:
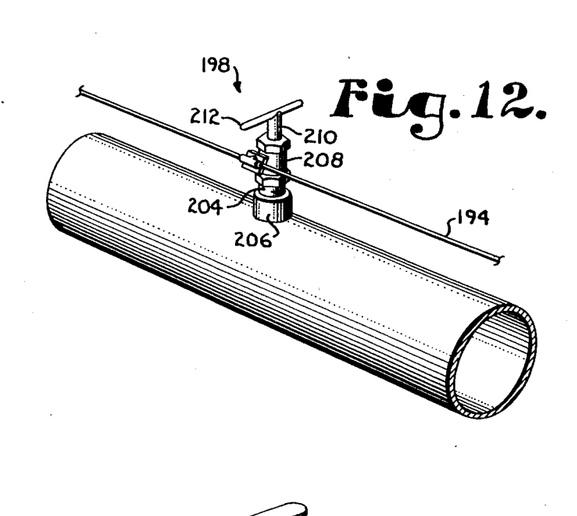
FIG. 12 is a perspective view illustrating one of the secondary sprinklers on the main irrigation boom.

FIG. 12 illustrates the structure of each of the secondary sprinklers 198. A pipe nipple 204 is threaded into a connection 206 on top of the main boom 10. A normally open valve 208 is threaded onto the pipe nipple and receives a riser 210 leading to a sprinkler 212. The control line 194 connects with valve 208 and continues on to connection with the valves of the remaining secondary sprinklers. When the No. 4 sprinkler on the extension boom is activated, it applies water pressure to line 194 and thereby closes all of the valves 208 of the secondary sprinklers. When the pressure on line 194 is relieved, valves 208 are open to provide water to the sprinklers 212. The numbered sprinklers on the extension boom 18 are constructed similarly to the sprinkler shown in FIG. 12, except that the No. 20 sprinkler differs in that it has a strainer below the valve.

With reference again to FIG. 6, the swing tower 22 is provided with two sensors 214 and another sensor 215 mounted on an elongate horizontal arm 216. Arm 216 is mounted to a pair of brackets 218 which are secured to one of the tower legs 78. The sensors are null sensing devices that respond to the signal from the buried cable 24 (FIG. 1) to control the steering motor 86 in a manner to guide the swing tower 22 along the path provided by the cable 24. The mounting of sensor 214 on an arm extending ahead of the wheel 80 allows it to smooth out small curves in the path provided by cable 24. The smooth and accurate steering action provided by this arrangment is important in achieving effectiveness in the steering angle control system, as will be explained more fully.

Figures 16, 17, 20:
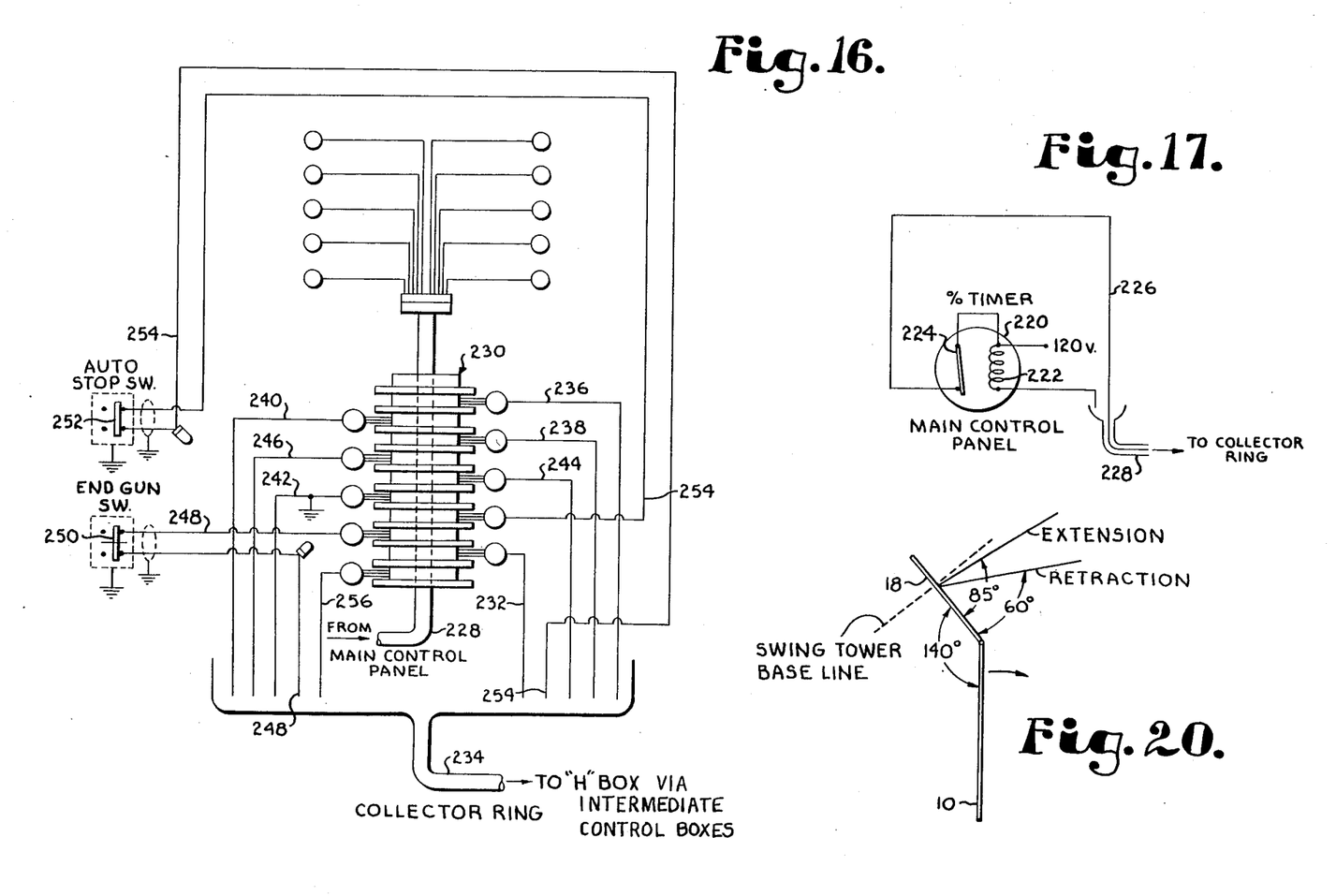
FIG. 16 is a schematic diagram of the electrical circuit for the collector ring at the pivot point of the irrigation machine.
FIG. 17 is a circuit diagram of the primary percent timer on the main control panel of the irrigation machine.
FIG. 20 is a diagrammatic view illustrating typical steering angles of the steerable support tower during extension and retraction of the swing span.

The operation of the sprinklers and the drive motors for the support towers is controlled by an electrical system which is shown schematically in FIGS. 16-19. Referring first to FIG. 17, the main control panel of the irrigation machine has an adjustable percent timer 220. The percent timer includes a coil 222 and a switch 224 controlled by the coil. One hundred twenty volts is applied to coil 222. The percent timer 220 can be set to effect closing of switch 224 for the percentage of time it is desired for the drive motors to operate during each period of the operating cycle of the timer. For example, if the percent timer 220 is set at 50 percent and there is a one minute time cycle, switch 224 is closed for 30 seconds of each minute and open for the other 30 seconds. When switch 224 is closed, 120 volts is applied to a conductor 226 which extends through a conduit 228 along with additional conductors.

Referring now to FIG. 16, conduit 228 leads to a collector ring assembly 230 located at the pivot stand 12 of the irrigation machine. The collector ring assembly 230 supplies electrical power to the rotating irrigation boom. The conductor 226 which is controlled by the percent timer 220 connects with another conductor 232 leading from the collector ring. Line 232 extends into a conduit 234 which leads to a control box on each support tower of the main boom, including the hinge tower 20. Also extending from the collector ring assembly through conduit 234 are conductors 236, 238 and 240 which apply 480 volts to the tower drive motors. The collector ring assembly also has a ground line 242 extending through conduit 234. A direction switch (not shown) controls the application of power to lines 244 and 246. Line 244 receives 120 volts when the machine is operating in the forward mode, and the other line 246 receives 120 volts in the reverse mode of operation of the machine.

Figure 19:
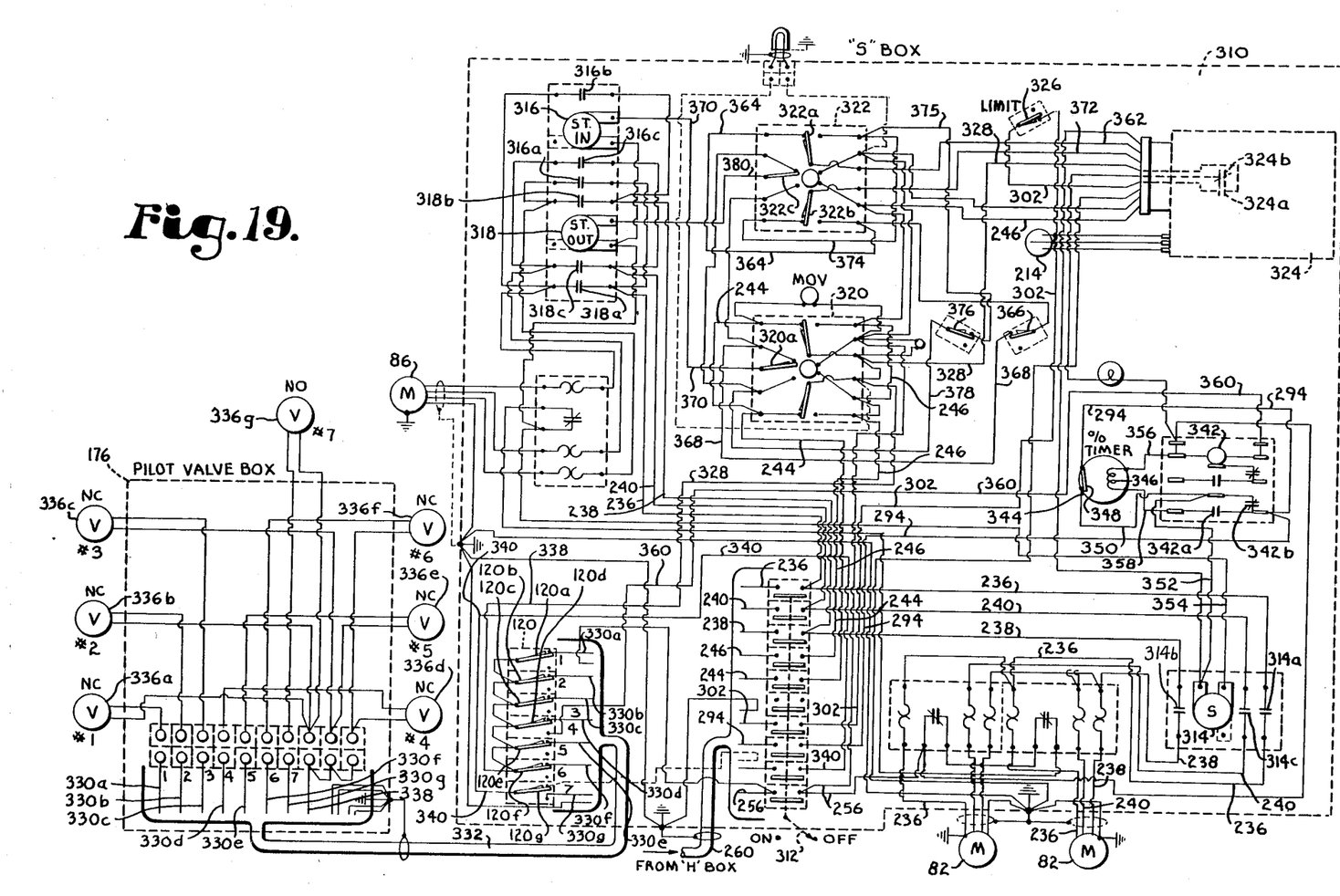
FIG. 19 is a schematic diagram of the electrical circuit on the steerable tower of the extension boom.

The collector ring assembly 230 has another conductor 248 which is provided with an end gun switch 250. Line 248 is energized if the end gun switch 250 is closed due to the continuous application of 120 volts to the end gun switch when the machine is energized Switch 250 is normally open and is closed by trip bolts (not shown) at the pivot stand 12 when the main boom 10 is in the corner areas of the field. End gun switch 250 is in series with switch 120g (FIG. 19). Thus, the end gun solenoid operation can be interrupted regardless of the swing span position in the field. The purpose of this arrangement is to avoid watering an obstacle without folding the boom backwards, thus giving a more precise control of the water application pattern of the swing span so as to avoid watering undesirable areas such as those occupied by buildings for example. An automatic stop switch 252 is included in a conductor 254 leading from the collector ring assembly. Conductor 254 receives power when the irrigation machine is switched on and is interrupted whenever the automatic stop switch 252 opens. Also extending through conduit 234 is a neutral line 256 leading from the bank of collector rings.

Figure 18:
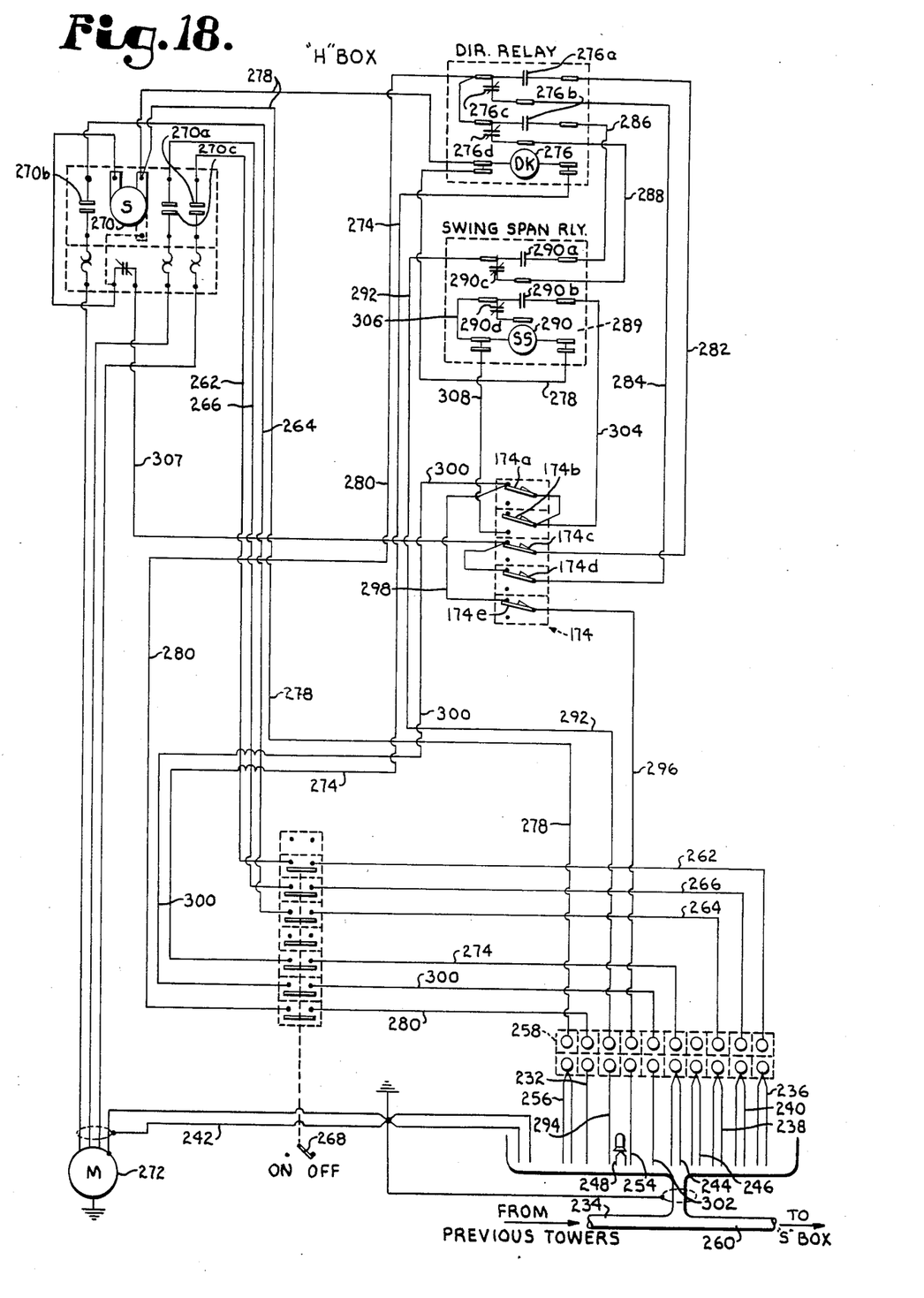
FIG. 18 is a schematic diagram of the electrical circuit in the control box of the hinge tower.

FIG. 18 depicts the circuitry in the control box of the hinge tower 20 which is actually mounted on the swing span 18 next to the hinge tower. The conductors leading to the hinge tower control box through conduit 234 connect to a terminal strip 258 (or directly to the disconnect in some cases). Lines 236–248 and 256 extend from connector 258 (or from the disconnect) back into a conduit 260 that leads to the control box for the swing tower 22. The 480 volt lines 236, 238 and 240 connect through connector 258 with respect to lines 262, 264 and 266. These lines have switch contacts controlled by an on/off switch 268 and, when the on/off switch is closed, lead to respective normally open relay contacts 270a, 270b and 270c controlled by a relay coil 270 serving as a starter for a drive motor 272 of the hinge tower. When the relay contacts are closed, lines 262, 264 and 266 apply 480 volts to motor 272 which then propels the wheels of hinge tower 20.

Line 244 connects through connector 258 with another line 274 having a contact of the on/off switch 268. Line 274 connects with one side of a direction relay coil 276 which controls two sets of normally open contacts 276a and 276b and two sets of normally closed contacts 276c and 276d. The neutral line 256 connects through connector 258 with a line 278 and that leads to one side of relay coil 270 and also to one side of coil 276 and on to relay coil 290. Thus, coil 276 is energized in the forward operating mode of the irrigation machine and is deenergized in the reverse mode.

The switches 174 controlled by cams 172 are five in number and are designated by numerals 174a–174e in FIG. 18. Switches 174a and 174b control the operation of the swing tower drive motors in the both directions by acting to latch and unlatch the swing span relay. Switches 174c and 174d control the hinge tower drive motor 272 in the forward and reverse modes of operation, respectively. Switch 174e is a limit switch that opens whenever the outer hinge joint 154 turns in either direction beyond a preselected limiting position.

Line 232 connects through connector 258 with a line 280 having one of the contacts of the on/off switch 268. Line 280 connects with one side of each set of contacts 276a–276d of the direction relay. Contacts 276a connect on their opposite side with a line 282 leading to switch 174c. Contacts 276c connect on their opposite side with a line 284 leading to switch 174d. The opposite sides of contacts 276b and 276d connect with respective lines 286 and 288 leading to a relay 289 that controls the operation of the swing tower drive motors. The relay 289 includes a coil 290 which controls two sets of normally open contacts 290a and 290b and two sets of normally closed contacts 290c and 290d. Lines 286 and 288 connect with contacts 290a and 290c, respectively. The opposite sides of contacts 290a and 290c connect with a line 292 leading to connection through connector 258 with a conductor 294 that extends through conduit 260 to the swing tower.

Line 254 connects through connector 258 with a line 296 leading to the limit switch 174e. Extending between the opposite side of switch 174e and one side of switch 174a is a conductor 298. Another conductor 300 connects with line 298 and extends through one contact of switch 268 to the connector 258. The connector provides a connection between line 300 and another line 302 that leads through conduit 260 to the swing tower.

The side of switch 174a opposite line 298 connects with a line 304 that also connects with switch 174b and one side of normally open contact 290b. The opposite side of contact 290b connects with a line 306 leading to one side of the relay coil 290. The opposite side of coil 290 connects with the neutral line 278. Line 308 connects at one end with line 306 and at the opposite end with one side of switch 174b.

FIG. 19 illustrates the control circuitry that operates the swing tower drive motors, sterring motor and sprinklers, although the circuitry in the "H-box" (FIG. 18) can interrupt the swing tower drive motors and the steering motor. The conduit 260 leading from the hinge tower extends to a control box 310 mounted on the swing tower 22. The conductors that extend within conduit 260 lead to the contacts of an on/off switch 312. The 480 volt conductors 236, 238 and 240 connect with the drive motors 82 of the swing tower through contacts of switch 312 and normally open contacts 314a, 314b and 314c. A tower starter coil 314 closes contacts 314a, 314b and 314c when energized.

Conductors 236, 238 and 240 also connect through the contacts of switch 312 with the steering motor 86. The direction the steering motor 86 is driven is controlled by steer in and steer out starters 316 and 318, respectively. The steer in starter 316 controls normally open contacts 316a, 316b and 316c, and the steer out starter controls normally open contacts 318a, 318b and 318c. When the steer in starter 316 is energized, its contacts close and 480 volts is applied to drive motor 86 in a direction to steer the tower wheels 80 in so that the extension boom 18 is retracted. Conversely, when the steer out starter 318 is energized, its contacts close and the 480 volt lines apply power to motor 86 in a manner to steer wheels 80 outwardly to effect extension of boom 18.

Line 244 leads to one contact of switch 312 and makes power available to the contact of a multiple contact relay 320 in the forward mode of operation. Line 246 also connects with one contact of switch 312, and in the reverse mode of operation, makes power available to the coil of relay 320 and to the coil of another multiple contact relay 322. Line 246 also leads to connection with a receiver 324 which receives signals from the two sensors 214 and from sensor 215.

Line 302 includes a contact of switch 312 and connects with receiver 324 through a normally closed limit switch 326. The receiver 324 includes a set of normally open contacts 324a and a set of normally closed contacts 324b. When contacts 324a are closed, line 302 is connected with a line 328 that connects with relay 320 and with the switch assembly 120 that is controlled by the steering angle of the swing tower wheels.

The switch assembly 120 includes seven switches 120a-120g which are activated in sequence with increasing steering angle. Line 328 provides power to one side of each switch 120a-120f. The opposite sides of switches 120a-120f normally connect with respective conductors 330a-330f that lead through a conduit 332 to a connector 334 located within the pilot valve box 176. Line 330a connects through connector 334 with one side of the normally closed No. 1 pilot valve 336a, and the remaining lines 330b-330f connect through the connector with a normally closed No. 2-6 pilot valves 336b-336f, respectively. The opposite side of each valve 336a-336f connects through connector 334 with a neutral line 338.

Line 248 connects through one contact of switch 312 with a conductor 340 leading to one side of the No. 7 switch 120g. When switch 120g is activated, its opposite side connects with a line 330g that extends through conduit 332 and connects through connector 334 with one side of the normally open No. 7 pilot valve 336g. The opposite side of valve 336g connects with the neutral line 338.

Line 294 includes one of the contacts of the on/off switch 312 and connects with a set of normally open relay contacts 342a and a set of normally closed contacts 342b. The contacts 342a and 342b are controlled by a relay coil 342. Line 294 also connects with a the contacts of a secondary percent timer 344 having a coil 346 which controls a switch 348. Line 294 connects with one side of the switch 348, and the other side of the switch connects with a line 350 that normally connects with line 294 through the normally closed contacts 342b. Extending between line 350 and the tower starter coil 314 is a conductor 352. The opposite side of the tower starter 314 connects with a neutral return line 354 that also connects with the steer in and steer out starter overload contacts 316 and 318. One side of coil 346 connects with a neutral line 356, and the other side of the coil connects with a line 358 that leads to the normally open relay contacts 342a.

The secondary percent timer 344 is similar to the primary percent timer 220 on the main control panel. When the coil 346 is energized, switch 348 remains closed for a preselected number of seconds of each minute. For example, if the secondary percent timer is set at 50 percent, switch 348 is closed for 30 seconds out of every minute that coil 346 is energized. Power is applied to relay coil 342 along a conductor 360. Conductor 360 is normally interrupted but connects with line 328 when the No. 4 cam operated switch 120d is tripped.

In the forward mode of operation, relays 320 and 322 are deenergized, and power is available to the steer in starter 316 through receiver 324 along line 362, switch 322a, line 364, line 365, steering switch 366, line 368, switch 320a, and line 370. Power is likewise available to the steer out starter 318 through the receiver along line 372, switch 322b, line 374, line 375, steering switch 376, line 378, switch 322c, and line 380. In the reverse mode of operation, relays 320 and 322 are energized and power is available to the steer in motor 316 through receiver 324 along line 362, switch 322a, line 375, switch 376, line 378, switch 320a, and line 370. Power is available to starter coil 318 through the receiver along line 372, switch 322b, line 365, switch 366, line 368, switch 322c, and line 380. Thus, the steer in and steer out starters 316 and 318 are controlled by the sensor 214 such that motor 86 steers the swing tower along the path defined by the buried cable 16.

In operation of the irrigation machine, water is pumped into the main irrigation boom 10 from a well or other suitable source (not shown). The drive motors for the support towers 14 of the main boom propel it through the field in the usual circular path. As boom 10 travels along the sides of the field, the extension boom 18 is folded back behind it. Since all of the sprinklers on the extension boom 18 are deactivated (including the No. 4 sprinkler), the control line 194 (FIG. 15) is not pressurized, and both sets of sprinklers 196 and 198 of the main boom 10 are activated. The sprinklers thus apply water along the length of the main boom 10 as it travels through the field. The conventional alignment system (not shown) of the main boom maintains towers 14 in alignment with one another and also maintains the hinge tower 20 in alignment with the remaining support towers 14 to maintain the main boom in a substantially straight condition.

As the main boom 10 approaches a corner area of the field, the extension boom 18 folds out into the corner of the field and then retracts back behind the main boom as it departs from the corner area, as best shown in the broken line views of FIG. 1. The leading sensor 214 picks up the signal emitted by the buried cable 24 and controls the steering motor 86 such that the swing tower 22 follows the path defined by the cable. As the extension boom 18 is being steered outwardly or inwardly about the inner hinge connection 146, the cams 118 monitor the steering angle of wheels 80 with respect to the axis of the extension boom 18, and the switch assembly 120 is controlled accordingly. As the steering angle increases, switches 120a-120g are tripped in succession. When switch 120a is tripped, power is removed from line 330a and the normally closed No. 1 pilot valve 336a closes. As shown in FIG. 14, the water pressure applied to the valves of sprinklers 5, 13, 21 and 29 is then relieved, and these four sprinklers of the extension boom are activated to begin applying water to the corner area of the field. When the steering angle is relatively small, the effective area covered by the extension boom is relatively small, and only a small number of sprinklers, (i.e. 4) are needed to adequately irrigate the corner area of the field.

As the steering angle increases during extension of the extension boom into the corner area of the field, the extension boom covers increasing area, and additional sprinklers are activated in a preselected sequence. When the No. 2 switch 120b is tripped, valve 336b closes and sprinklers 1, 9, 17 and 25 are activated. The remaining switches 120c-120g are tripped in sequence with increasing steering angle, and all of the sprinklers on the extension boom are activated when the steering angle of the swing tower is maximum and the extension boom 18 is covering maximum area.

The last switch that is tripped is the No. 7 switch 120g which then closes the normally open No. 7 pilot valve 336g. Since the end gun switch 250 (see FIG. 16) is arranged in series with switch 120g, it is necessary for both switches 250 and 120g to be closed in order to close the number seven pilot valve 336g in order to activate the large volume end gun 178. Since the end gun control is shared by the trip bolt operated end gun switch 250 located at the pivot stand and the cam controlled switch 120g of the swing tower, the end gun is activated and deactivated at the most advantageous times for proper water application. If desired, more than one end gun can be controlled in the same fashion to improve the water pattern at the outer end of the irrigation machine.

When the wheels 80 of the swing tower are steered approximately halfway out or halfway to the maximum steering angle, the No. 4 switch 120d is tripped. At this time, the No. 4 sprinkler on the end boom is activated as shown in FIG. 14. Referring additionally to FIG. 15, activation of the No. 4 sprinkler results in the application of water pressure to the control line 194 leading to the secondary sprinklers 198 on the main boom 10. The secondary sprinklers 198 are then deactivated as the primary sprinklers 196 continue to apply water to the field. Thus, as the sprinklers on the extension boom are activated, the secondary sprinklers on the main boom are deactivated. The sprinklers on the extension boom are sized so that the rate at which they discharge water is approximately equal to the rate at which the secondary sprinklers 198 apply water when activated. Consequently, the total flow rate remains substantially constant, and considerable hydraulic efficiencies are achieved. Use of the water supply is maximized since it is used at its highest capacity nearly all of the time.

As the extension boom folds out, the effective length of the irrigation machine increases, and the machine is automatically slowed down to compensate for the increased area of water application. Normally, line 294 controls the drive motors 82 of the swing tower under the control of the primary percent timer 220 (FIG. 17). Line 294 normally connects through contacts 342b with line 352 which leads to the tower starter coil 314, thereby energizing the drive motors 82 when the percent timer switch 224 is closed. However, when the extension boom has folded out far enough to trip the number four switch 120d, power is applied to line 360 for energization of relay coil 342. Contacts 342b then open and contacts 342a close to provide a current path from line 294 to coil 346. The only available current path to the tower starter 314 is along line 294 and through the secondary percent timer switch 348 to lines 350 and 352. The secondary percent timer 344 is thus brought into the swing tower control circuit in series with the primary percent timer 220. The secondary percent timer is preferably set at a percentage to effectively reduce the primary percent timer to approximately 60% of its setting. Slowing of the swing tower 22 results in slowing of the hinge tower 20 and the remainder of the irrigation machine, as will be explained more fully, and compensation is thereby made for the increased system length as the extension boom folds out into the corner areas of the field. Slowing of the main boom 10 also compensates for the reduced rate of water application when the secondary sprinklers 198 are deactivated.

As the main boom 10 continues past the position shown in solid lines in FIG. 1, it begins to depart from the corner of the field, and the extension boom 18 begins folding back behind the main boom. During the retraction stage of operation, the cams 118 continue to monitor the steering angle of the swing tower wheels 80 and deactivate the sprinklers of the extension boom in reverse sequence as the steering angle decreases. When the swing tower wheels are steered approximately halfway in, the No. 4 switch 120d moves back to the position shown in FIG. 19 to remove power from line 360, thereby deactivating relay coil 342 and removing the secondary percent timer 344 from the control circuit. The machine then speeds up since the drive motors are controlled solely by the primary percent timer 220. At the same time, the No. 4 sprinkler on the extension boom is deactivated, and the secondary sprinklers 198 are then activated due to the removal of water pressure from the control line 194. When the main boom 10 has moved completely out of the corner area of the field, the extension boom 18 is fully retracted and all of the switches 120a–120g are in the positions shown in FIG. 19 to deactivate all of the sprinklers on the extension boom. The extension boom remains fully retracted along the side of the field and begins to extend again as the main boom approaches the next corner area of the field.

Control of the secondary percent timer 344 in accordance with the steering angle provides effective control of the overall machine speed. The secondary percent timer, when in the control circuit, directly controls the speed of the swing tower 22 to assure that it moves at the proper speed to uniformly apply water to the field corners. The hinge tower 20 is in turn controlled by the swing tower speed, due to the limit switches 174, and the alignment system of the main boom 10 controls the support towers 14 from the hinge tower. Accordingly, the speed of all towers is controlled by the swing tower during some intervals of swing tower operation. When the swing span is fully retracted the hinge tower is not interrupted by the swing tower.

It is again pointed out that the cams 118 which control switches 120a–120g monitor the steering angle of the swing tower wheels rather than the angle between the main and extension booms. The steering angle is a measure of the rate at which the swing span is extending or retracting and is thus an accurate measure of the change in the area that is being covered by the swing span. For example, FIG. 20 illustrates that with the extension boom 18 oriented at 140° relative to the main boom 10, the steering angle is considerably different depending upon whether the extension boom is being extended or retracted. During extension, the steering angle is about 85°, and the increase in the land area that is being covered by the extension boom is relatively great. Accordingly, it is desirable for uniform water application to activate a large number of sprinklers. During retraction, the steering angle is approximately 60°, and there is a relatively small rate of change in the area that is being covered by the extension boom. Consequently, a relatively small number of sprinklers should be activated in order to prevent overwatering of this area of the field. By controlling the sprinkler operation in accordance with the steering angle, significant overwatering and underwatering of portions of the field corner is avoided.

As the extension boom 18 swings inwardly and outwardly, it pivots about the vertical hinge axis provided by the inner hinge joint 146. The inner and outer hinge joints 146 and 154 cooperate to permit linear motion parallel to the extension boom 18 in order to properly control the drive motors of the hinge tower 20 and the swing tower 22. Referring to FIG. 18, the hinge tower starter coil 270 is normally energized under the control of the primary percent timer 220 (see FIG. 17). The line 232 leading from the primary percent timer connects with line 280 which, in the forward mode of operation, connects through contacts 276a with line 282 since coil 276 is then energized to close contacts 276a. Line 282 connects with coil 270 through switch 174c and line 307, and the starter coil 270 then closes its contacts 270a–270c to complete the 480 volt circuits to the hinge tower drive motors 272.

If the hinge tower 20 begins moving too far ahead of the swing tower 22, the hinge tower pulls plate 130 in a counterclockwise direction about the outer hinge connection 154 as viewed in FIG. 10. The control linkage provided by brackets 162 and 166 and rods 164 then turns shaft 168 such that one of the cams 172 opens switch 174c. The connection between lines 282 and 307 is then broken, and starter 270 is deenergized to shut off the hinge tower drive motors 272, thereby stopping the hinge tower until the swing tower has advanced far enough to again effect closing of switch 174c. At this time, the hinge tower resumes advancement under the control of the primary percent timer. With the hinge tower stopped, the alignment system on the main boom stops the support towers 14 one after the other to maintain the proper alignment.

In the reverse mode of operation, switch 174d similarly controls the hinge tower drive motors 272 in accordance with the angular motion of the outer hinge joint 154.

In the forward mode of operation, the swing tower drive motors 82 are likewise normally controlled by the primary percent timer 220. With continued reference to FIG. 18, the swing span relay coil 290 is normally energized in the forward mode of operation and is maintained energized by the circuit provided by line 296, the limit switch 174e, line 298, switch 174a, line 304, relay contacts 290b, and line 306. A circuit leading to the drive motors of the swing towers is then completed along lines 232 and 280, relay contacts 276b, line 286, relay contacts 290a, and lines 292 and 294. However, if the swing tower should move too far ahead relative to the hinge tower, the resulting angular motion about the outer hinge joint 154 is translated by the control linkage into rotation of the cams 172, one of which opens switch 174a. Lines 298 and 304 are then disconnected to deenergize relay coil 290 and open contacts 290a to interrupt the connection between lines 286 and 292. The swing tower drive motors 82 are thereby shut off until the hinge tower has advanced far enough to again close switch 174a. Switch 174b shuts down the swing tower drive motors in a similar fashion in the reverse mode of operation if the swing tower should advance too far ahead of the hinge tower.

In this manner, the two hinge connections 146 and 154 cooperate to provide the required linear motion, while the angular motion about the outer hinge connection 154 is used to properly control the drive motors of the hinge and swing towers. The double hinge construction provides accurate control of the towers and eliminates the difficulties involved in the sliding connections that have been proposed in the past. The limit switch 174e of the outer hinge joint is tripped by one of the cams 172 to shut down all drive motors if the movement about the outer hinge joint in either direction is excessive.

It is thus apparent that the irrigation machine provided by the present invention applies water to the corner areas of a square field more uniformly than can be achieved by the corner systems that have been proposed in the past. At the same time, improved hydraulic efficiency is achieved due to the substantially constant flow rate at all stages of the operating cycle. The drive motors and sprinklers are controlled in an improved manner, and significant structural improvements ar provided by the double hinge arrangement and the integrated truss structure on the extension boom.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. In a center pivot irrigation machine having a main boom supported to pivot about one end to cover a generally circular area of a field, a plurality of driven support units carrying said main boom, and a plurality of outlets in said main boom for discharging water supplied thereto at said one end, a corner watering apparatus comprising:

an extension boom for applying water to corner areas of the field beyond said circular area;

means for pivotally coupling said extension boom with the end of said main boom opposite said one end, said extension boom being in fluid communication with said main boom to receive water therefrom;

a plurality of sprinklers spaced along said extension boom, each sprinkler being operable when activated to discharge water from the extension boom;

a steerable support tower for said extension boom, said tower having driven wheels mounted to turn to vary the steering angle of the wheels relative to the extension boom, thereby steering the extension boom in a manner to pivotally extend and retract the same relative to said main boom;

guide means for steering said wheels along a path effecting extension of the extension boom into each corner area of the field approached by the main boom and retraction of the extension boom out of each corner area as the main boom departs therefrom;

means for sensing the steering angle of the wheels relative to the extension boom; and means for selectively controlling activation and deactivation of the sprinklers in accordance with the steering angle in a manner to enhance the uniformity of water application to the corner areas of the field.

2. The invention of claim 1, wherein:

said sprinklers define a plurality of separate groups each including a preselected number of sprinklers;

each group of sprinklers has a valve which activates and deactivates the sprinklers in the group; and said control means is operable to activate the valves in a predetermined sequence in response to changes in the steering angle during extension of the extension boom into the corner areas and to deactivate the valves in a predetermined sequence in response to changes in the steering angle during retraction of the extension boom out of the corner areas.

3. The invention of claim 2, wherein said control means includes:

a cam for each valve arranged to turn with changes in the steering angle; and a switch for each cam controlled thereby in a manner to activate the corresponding valve when the cam reaches a position corresponding to a preselected steering angle.

4. The invention of claim 1, including means for slowing said main and extension booms when a preselected steering angle is reached during extension of the extension boom into the corner areas of the field.

5. The invention of claim 4, including means for speeding up said main and extension booms when said preselected steering angle is reached during retraction of the extension boom out of the corner area of the field.

6. The invention of claim 1, including:

means for closing selected outlets of the main boom when a preselected steering angle is reached during extension of the extension boom into the corner areas of the field; and means for opening said selected outlets of the main boom when said preselected steering angle is reached during retraction of the extension boom out of the corner areas of the field.

7. The invention of claim 6, including:

means for slowing said main boom when said preselected steering angle is reached during extension of the extension boom into the corner areas; and means for speeding up said main boom when said preselected steering angle is reached during retraction of the extension boom out of the corner areas.

8. In a center pivot irrigation machine having a main boom supported to pivot about one end to cover a generally circular area of a field, an extension boom pivotally coupled with the opposite end of said main boom to irrigate corner areas of the field beyond said circular area, means for pivotally extending the extension boom into corner areas of the field approached by the main boom and pivotally retracting the extension boom out of the corner areas as the main boom departs therefrom, and drive means for propelling the main and extension boom through the field, the improvement comprising:

first and second sets of sprinklers each including a plurality of normally activated sprinklers spaced along substantially the entire length of the main boom, each sprinkler in said first and second sets being operable when activated to discharge water from the main boom for application to said circular area of the field;

a plurality of sprinklers spaced along the extension boom, each sprinkler on the extension boom being operable when activated to discharge water from the extension boom for application to the corner areas of the field;

means for activating the sprinklers on the extension boom in a preselected sequence as the extension boom is being extended into the corner areas of the field;

means for deactivating the sprinklers on the extension boom in a preselected sequence as the extension boom is being retracted out of the corner areas of the field; and means for deactivating all of the sprinklers in said first set of sprinklers on the main boom when a preselected sprinkler on the extension boom is activated.

9. The improvement set forth in claim 8, including means for controlling said drive means in a manner to effect slowing of said main boom when said preselected sprinkler is activated.

10. The improvement set forth in claim 8, including means for effecting activation of the sprinklers in said first set when said preselected sprinkler is deactivated during retraction of the extension boom out of the corner area of the field.

11. The improvement set forth in claim 8, wherein the sprinklers in said first set are arranged to alternate with the sprinklers in said second set along the length of said main boom.

* * * * *